(12) United States Patent
An et al.

(10) Patent No.: US 12,145,482 B2
(45) Date of Patent: Nov. 19, 2024

(54) SEATING DEVICE

(71) Applicants: Hyundai Motor Company, Seoul (KR); Kia Corporation, Seoul (KR)

(72) Inventors: Jea Kyoo An, Seoul (KR); Hun Keon Ko, Anyang-si (KR); Hyun Kyoo Park, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 305 days.

(21) Appl. No.: 17/857,801

(22) Filed: Jul. 5, 2022

(65) Prior Publication Data

US 2023/0264609 A1 Aug. 24, 2023

(30) Foreign Application Priority Data

Feb. 21, 2022 (KR) .................. 10-2022-0022515

(51) Int. Cl.
  *B60N 2/20* (2006.01)
  *B60N 2/22* (2006.01)
  *B60N 2/23* (2006.01)
  *B60N 2/75* (2018.01)
  *A47C 1/03* (2006.01)
  *A61G 5/12* (2006.01)
  *B60N 3/00* (2006.01)

(52) U.S. Cl.
  CPC ............. *B60N 2/23* (2013.01); *B60N 2/2236* (2013.01); *B60N 2/77* (2018.02); *A47C 1/03* (2013.01); *A61G 5/125* (2016.11); *B60N 2/763* (2018.02); *B60N 3/001* (2013.01)

(58) Field of Classification Search
  CPC .......... B60N 2/763; B60N 2/767; B60N 2/77; B60N 2/773; B60N 2/777; B60N 3/001; A47C 1/03; A47C 7/68; A47C 7/54; A47C 7/541; A61G 5/125; A61G 7/1092; A61G 13/1235
  See application file for complete search history.

(56) References Cited

U.S. PATENT DOCUMENTS 5,931,537 A * 8/1999 Gollin ................. A47C 1/03
                                                                  297/411.27
7,104,609 B2 * 9/2006 Kim ..................... B60N 2/79
                                                                  297/411.3
7,438,318 B2 * 10/2008 Sano .................... B60N 2/753
                                                                  180/326

(Continued)

FOREIGN PATENT DOCUMENTS

CN    203042677 U    7/2013
CN    104398347 A    3/2015

(Continued)

*Primary Examiner* — Syed A Islam
(74) *Attorney, Agent, or Firm* — Slater Matsil, LLP

(57) ABSTRACT

An embodiment seating device includes a frame unit including a chair region capable of supporting a user and a leg region extending downward from the chair region, a backrest unit disposed at a rear side of the frame unit, and a handle unit coupled to a first side of the frame unit, the handle unit including a fixing handle body region having a first side coupled to the frame unit and rotatable relative to the frame unit and a lifting handle body region having a first side coupled to the fixing handle body region and rectilinearly movable relative to the fixing handle body region.

20 Claims, 17 Drawing Sheets

(56) References Cited

U.S. PATENT DOCUMENTS

| | | | | |
|---|---|---|---|---|
| 9,107,507 | B2* | 8/2015 | Wallis | A61G 5/12 |
| 10,543,768 | B2* | 1/2020 | Richards | B66F 9/0759 |
| 11,045,003 | B2* | 6/2021 | Fietz | A47C 1/0307 |
| 11,890,978 | B1* | 2/2024 | Boyd | B60N 2/77 |
| 2008/0111338 | A1* | 5/2008 | Ilan | A61G 5/1002 |
| | | | | 280/250.1 |
| 2017/0252237 | A1 | 9/2017 | Kuiken et al. | |
| 2020/0237602 | A1 | 7/2020 | Bardgett et al. | |
| 2020/0376996 | A1* | 12/2020 | Planson | B60N 2/77 |
| 2021/0085541 | A1* | 3/2021 | Takei | A61G 5/125 |
| 2023/0211739 | A1* | 7/2023 | Nuss | H04R 1/02 |
| | | | | 381/86 |

FOREIGN PATENT DOCUMENTS

| | | |
|---|---|---|
| CN | 211985981 U | 11/2020 |
| JP | H08257061 A | 10/1996 |
| JP | 2007181639 A | 7/2007 |
| JP | 2020508826 A | 3/2020 |
| KR | 101545692 B1 | 8/2015 |
| KR | 101721864 B1 | 4/2017 |
| WO | 2020013043 A1 | 1/2020 |

\* cited by examiner

SEATING DEVICE

CROSS-REFERENCE TO RELATED APPLICATIONS

This application claims the benefit of Korean Patent Application No. 10-2022-0022515, filed on Feb. 21, 2022, which application is hereby incorporated herein by reference.

TECHNICAL FIELD

The present disclosure relates to a seating device.

BACKGROUND

With increasing demands for mobility vehicles which may accommodate and transport persons, studies for improving performance of the mobility vehicles are being actively conducted.

Meanwhile, as one of the aforementioned mobility vehicles, there is a wheelchair including a chair-shaped structure on which a user may sit, and a driving body having wheels capable of moving the structure. Studies on the wheelchair are being actively conducted to improve convenience for users. Because the wheelchairs are mobility vehicles mainly used by persons with reduced mobility, the wheelchair needs to be designed to enable a user to easily sit on the wheelchair or conveniently rise from the wheelchair.

However, in the related art, there is no means separately provided in the wheelchair to assist the user in sitting on the wheelchair or rising from the wheelchair. For this reason, there is a problem in that the convenience for the user is limited.

SUMMARY

The present disclosure relates to a seating device. Particular embodiments relate to a seating device having a structure capable of improving convenience for an occupant.

Embodiments of the present disclosure provide a wheelchair equipped with a means capable of assisting a user with reduced mobility in sitting on the wheelchair or rising from the wheelchair.

An exemplary embodiment of the present disclosure provides a seating device including a frame unit including a chair region capable of supporting a user upward, and a leg region extending downward from the chair region, a backrest unit disposed at a rear side of the frame unit, and a handle unit coupled to one side of the frame unit, in which the handle unit includes a fixing handle body region having one side coupled to the frame unit and provided to be rotatable relative to the frame unit, and a lifting handle body region having one side coupled to the fixing handle body region and provided to be rectilinearly movable relative to the fixing handle body region.

The handle unit may further include a motor including a rotary shaft, a screw member having a screw thread region formed on an outer portion thereof, and a nut member coupled to the screw thread region of the screw member and configured to rotate by receiving power from the motor, the screw member may be fixedly coupled to the fixing handle body region, the nut member may be rotatably coupled to the lifting handle body region, and the lifting handle body region may perform a translational motion relative to the fixing handle body region by means of a translational motion of the nut member.

The seating device may further include a connection rotary shaft having one side configured to penetrate the fixing handle body region and the other side configured to penetrate the leg region, the handle unit may further include a torsion spring member including a winding region, a first spring extension region extending from one side of the winding region, and a second spring extension region extending from the other side of the winding region, and the connection rotary shaft may be inserted into and coupled to the winding region.

The seating device may further include a spring accommodation member protruding from the connection rotary shaft in a direction intersecting a direction in which the connection rotary shaft extends, and the first spring extension region of the torsion spring member may be seated in an internal space of the spring accommodation member.

The screw member may include a spring interference region configured to face the torsion spring member, and the handle unit may further include an interference region fixing member having one side fixedly coupled to the spring interference region and the other side fixedly coupled to the fixing handle body region.

The spring interference region may include an interference body portion provided to face the torsion spring member and configured to come into close contact with the second spring extension region when the fixing handle body region rotates relative to the chair region by an angle exceeding a predetermined angle.

The spring interference region may further include an interference guide portion protruding from the interference body portion and configured to surround an outer side of the second spring extension region.

The seating device may further include a peripheral recessed member disposed outside the connection rotary shaft and having a plurality of recessed sections disposed in a circumferential direction of the connection rotary shaft and each having a shape recessed toward the connection rotary shaft, and the handle unit may further include a coupling module including a pin member provided to be rotatable so as to be inserted into the recessed section or spaced apart from the recessed section.

The coupling module may further include a rotation locking button member coupled to the fixing handle body region, provided to be movable relative to the fixing handle body region, and fixed to the pin member, and the pin member may be inserted into the recessed section or spaced apart from the recessed section by a movement of the rotation locking button member relative to the fixing handle body region.

The handle unit may further include a clutch fixing module detachably provided on the fixing handle body region, the clutch fixing module may include a fixing module body region having a through-hole formed therein, a fixing pin region protruding from the fixing module body region toward the fixing handle body region, and a first interference region having one side connected to the fixing pin region and having a shape extending from one side in a direction away from the fixing pin region, and the fixing handle body region may include a pin insertion hole formed in a surface of the fixing handle body region and configured such that the fixing pin region is inserted into the pin insertion hole, and a second interference region having a shape extending in a direction away from the pin insertion hole and protruding toward the clutch fixing module.

The clutch fixing module may further include a first magnet disposed adjacent to the fixing pin region, and the fixing handle body region may further include a second magnet configured to face the first magnet when the fixing pin region is inserted into the pin insertion hole.

The fixing handle body region may further include a guide region spaced apart from the second interference region in a circumferential direction A of the pin insertion hole and protruding toward the clutch fixing module, the guide region may have a shape having a height at which the guide region protrudes outward, and the height may vary depending on positions in the circumferential direction A of the pin insertion hole.

The guide region may have a shape such that the height at which the guide region protrudes outward decreases toward two opposite ends based on the circumferential direction A of the pin insertion hole.

The clutch fixing module may further include a bolt member protruding from the fixing module body region toward the fixing handle body region and a bolt rotating member connected to the bolt member and configured to rotate the bolt member, and the fixing handle body region may further include a fixing handle nut member provided on a surface of the fixing handle body region and coupled to the bolt member by a bolt-nut engagement.

The backrest unit may be rotatable relative to the frame unit. The backrest unit may include a first concave-convex member having a first concave-convex region, a second concave-convex member having a second concave-convex region having a shape corresponding to the first concave-convex region, a first handle member fixedly coupled to the second concave-convex member, a rod member configured to penetrate the second concave-convex member, and a backrest unit rotary shaft configured to penetrate the first concave-convex member and the rod member, the second concave-convex member may be movable in a direction in which the rod member extends, and the first concave-convex member and the rod member may be rotatable about the backrest unit rotary shaft.

The backrest unit may further include a second handle member fixedly coupled to the rod member and spaced apart from the first handle member in the direction in which the rod member extends and a handle elastic member disposed between the first handle member and the second handle member and configured to support the first handle member and the second handle member.

The first concave-convex region of the first concave-convex member may be provided in plural, and the plurality of first concave-convex regions may be disposed in a circumferential direction of the backrest unit rotary shaft.

The chair region may include a chair frame having a shape extending in a horizontal direction, a wire member having one side fixed to the second handle member, a wire fixing pin member to which the other side of the wire member is fixed, and a pin accommodation member fixedly coupled to the chair frame, configured to accommodate the wire fixing pin member, and having an internal space in which the wire fixing pin member is movable, and the leg region may include a first link having a link hole into which the pin accommodation member is inserted.

The chair region may further include a pin pressing elastic member disposed in the pin accommodation member and configured to press the wire fixing pin member toward the first link, and the wire member may be configured to pull the wire fixing pin member in a direction opposite to a direction in which the pin pressing elastic member presses the wire fixing pin member.

The chair region may further include a pulley member fixedly coupled to the chair frame and provided between the wire fixing pin member and the second handle member based on a direction in which the wire member extends, and the wire member may be bent around the pulley member.

The chair region may further include a support member provided between the pin accommodation member and the first link and fixedly coupled to the chair frame, and the pin accommodation member may be fixedly coupled to the support member.

The leg region may further include a second link spaced apart from the first link and provided in parallel with the first link, a third link having one side rotatably coupled to the first link and the other side rotatably coupled to the second link, and a leg cover configured to surround outer sides of the first to third links and configured such that the other side of the first link and the other side of the second link are rotatably coupled to the leg cover.

The leg region may further include a fourth link having one side rotatably coupled to the first link and the other side rotatably coupled to the second link, the leg region being spaced apart from the third link.

The link hole may be formed above a region in which the first link and the third link are coupled, and the third link may be provided above the fourth link.

The connection rotary shaft may be coupled to the first link.

The seating device may further include a drive unit coupled to one side of the leg region of the frame unit and including wheels and a power source configured to operate the wheels. The drive unit may include a drive body having one side rotatably coupled to the leg region and the other side to which the wheel is coupled, and a brake unit coupled to one side of the drive body, and the brake unit may include a brake link having one side rotatably coupled to the drive body and a brake pad coupled to one side of the brake link and configured to come into contact with the wheel or move away from the wheel as the brake link rotates.

The brake unit may further include a first button member coupled to an upper region of the brake link and configured to move the brake pad toward the wheel when the first button member is pressed downward and the brake link rotates, and a brake releasing member having one side coupled to the drive body and the other side coupled to the brake link, the brake releasing member being configured to pull the brake pad in a direction away from the wheel.

The brake unit may further include a parking link having one side rotatably coupled to the drive body and configured to come into contact with the brake link when the brake link rotates by a predetermined rotation angle or more, a first ratchet region having a concave-convex shape may be formed in a region of the brake link which is configured to communicate with the parking link, and a second ratchet region having a shape corresponding to the first ratchet region may be formed in a region of the parking link which is configured to come into contact with the brake link.

The brake unit may further include a second button member provided in an upper region of the parking link and configured to move the parking link away from the brake link when the second button member is pressed downward and the parking link rotates. The brake link may include a shape that extends from a region coupled to the first button member to a region rotatable relative to the drive body and then is bent and extends to a region coupled to the brake pad, and the parking link may include a shape that extends from a region coupled to the second button member to a region rotatable relative to the drive body and then is bent and extends to a region having the second ratchet region.

The wheel may include a front wheel coupled to a front region of the drive body and configured to directly rotate by receiving power and a rear wheel coupled to a rear region of the drive body and configured to be rotated and steered without receiving power.

According to embodiments of the present disclosure, it is possible to provide the wheelchair equipped with the means capable of assisting the user with reduced mobility in sitting on the wheelchair or rising from the wheelchair.

DETAILED DESCRIPTION OF ILLUSTRATIVE EMBODIMENTS

Hereinafter, a seating device according to embodiments of the present disclosure will be described with reference to the drawings.

Figure 1:
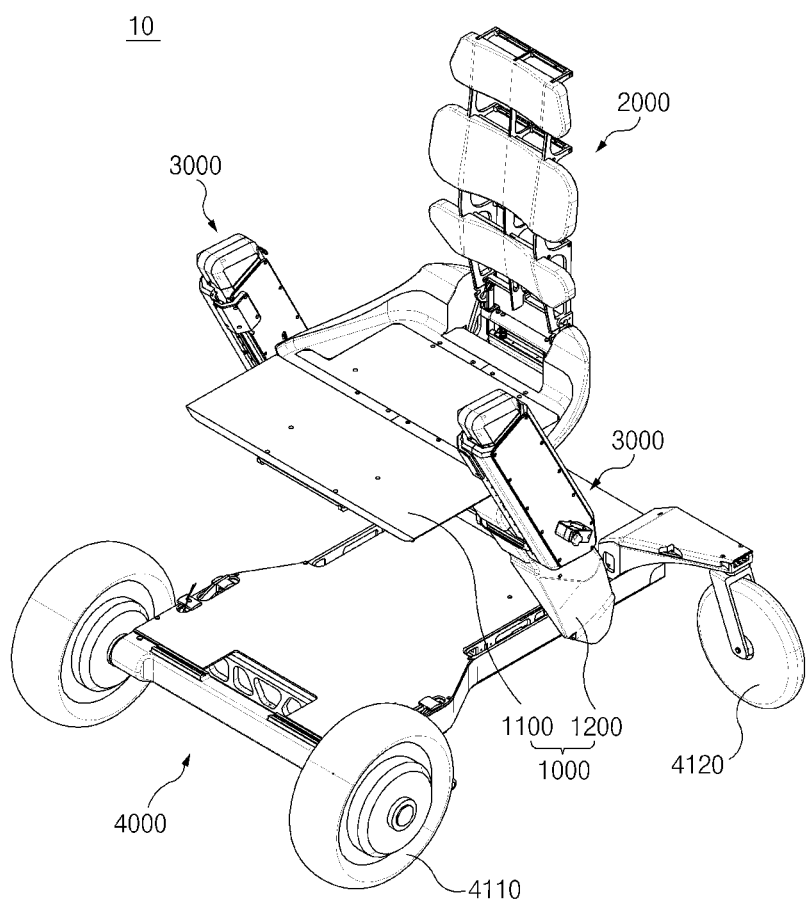
FIG. 1 is a perspective view illustrating a seating device according to embodiments of the present disclosure.
Figure 2:
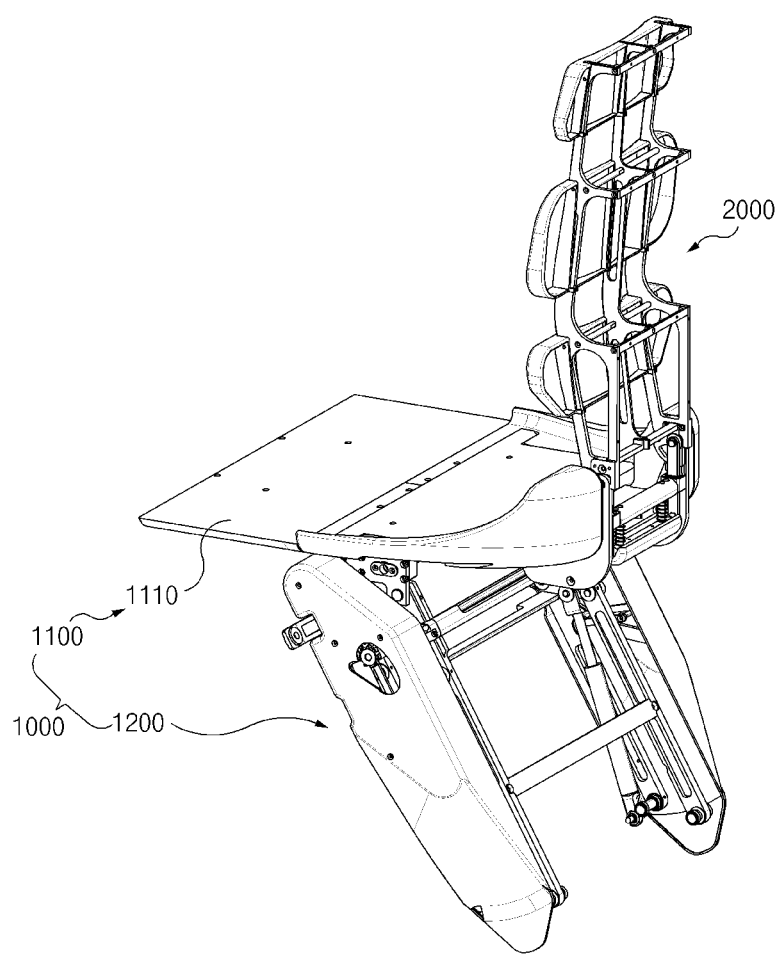
FIG. 2 is a perspective view illustrating a coupling structure between a frame unit and a handle unit of the seating device according to embodiments of the present disclosure.

FIG. 1 is a perspective view illustrating the seating device according to embodiments of the present disclosure, and FIG. 2 is a perspective view illustrating a coupling structure between a frame unit and a handle unit of the seating device according to embodiments of the present disclosure.

A seating device 10 according to embodiments of the present disclosure may include a frame unit 1000 including a chair region 1100 capable of supporting a user upward, and leg regions 1200 extending downward from the chair region 1100, a backrest unit 2000 disposed at a rear side of the frame unit 1000 and configured to support a user's back, and a handle unit 3000 coupled to one side of the frame unit 1000.

FIGS. 1 and 2 illustrate that the seating device 10 according to embodiments of the present disclosure has a wheelchair structure. However, the seating device 10 according to the present disclosure is not limited only to the wheelchair. The seating device 10 may be applied to any item (e.g., an office chair) as long as the item has a structure on which the user may sit. For example, in a case in which the seating device 10 has a structure capable of moving by using its power like an electric wheelchair, the seating device 10 may further include a drive unit 4000 coupled to one side of the leg region 1200 of the frame unit 1000 and including wheels 4100 and a power source 4200 configured to operate the wheels 4100.

Meanwhile, according to embodiments of the present disclosure, a part of the handle unit 3000 may be movable from the frame unit 1000. Hereinafter, the handle unit 3000 will be described in detail with reference to the drawings.

Figure 3:
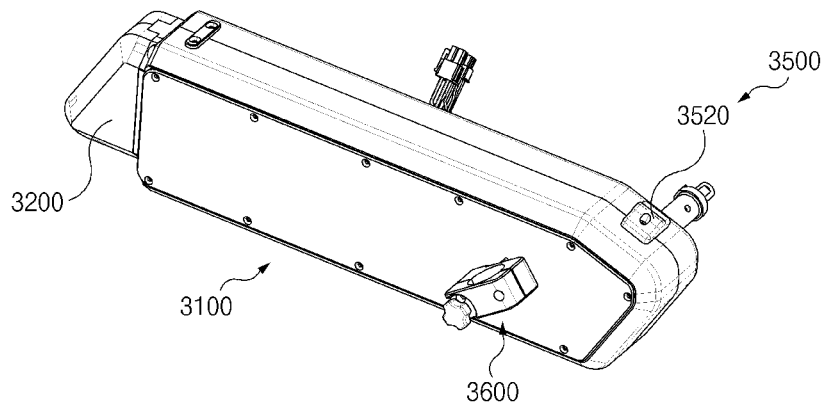
FIG. 3 is a perspective view illustrating the handle unit of the seating device according to embodiments of the present disclosure.
Figure 4:
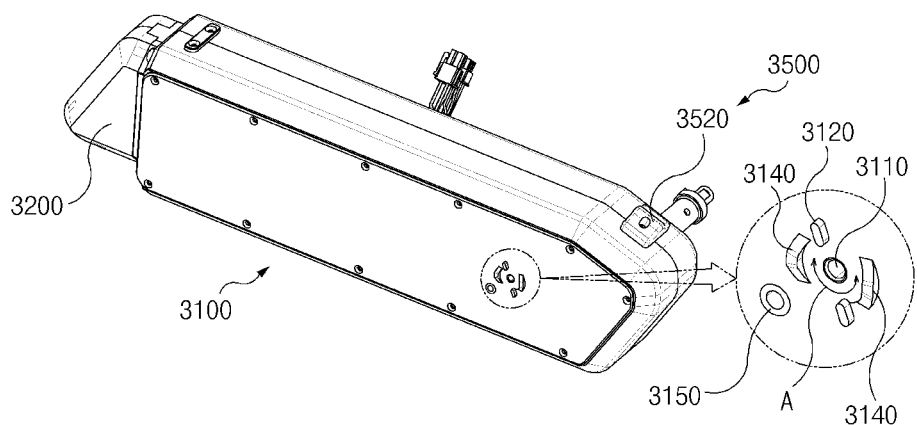
FIG. 4 is a perspective view illustrating the handle unit in a state in which a clutch fixing module illustrated in FIG. 3 is removed.
Figure 5:
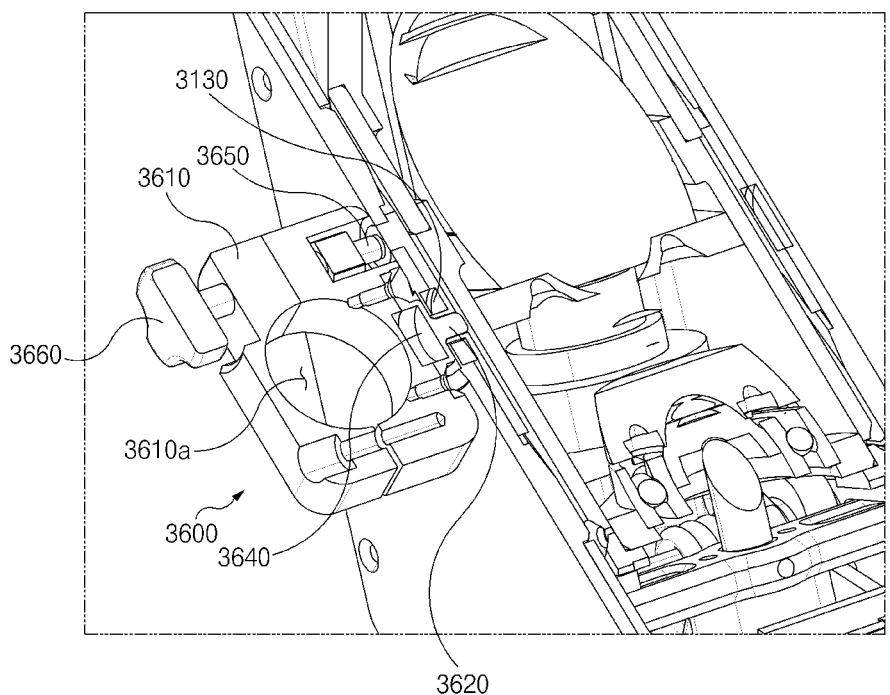
FIG. 5 is a view illustrating a cross-section in a state in which the clutch fixing module is coupled to a fixing handle body region of the handle unit of the seating device according to embodiments of the present disclosure.
Figure 6:
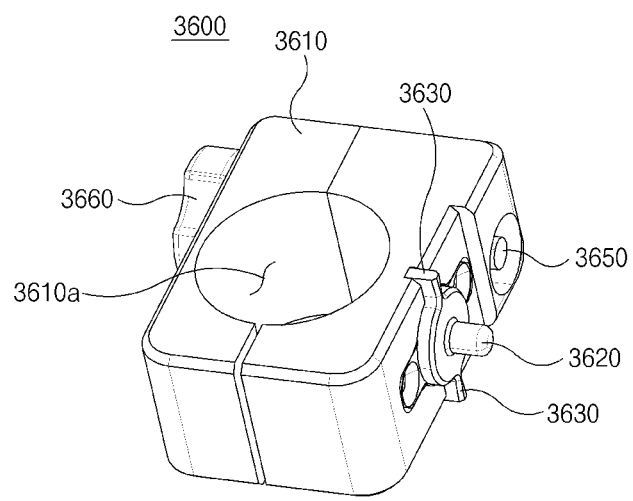
FIG. 6 is a perspective view illustrating the clutch fixing module provided on the handle unit of the seating device according to embodiments of the present disclosure.
Figure 7:
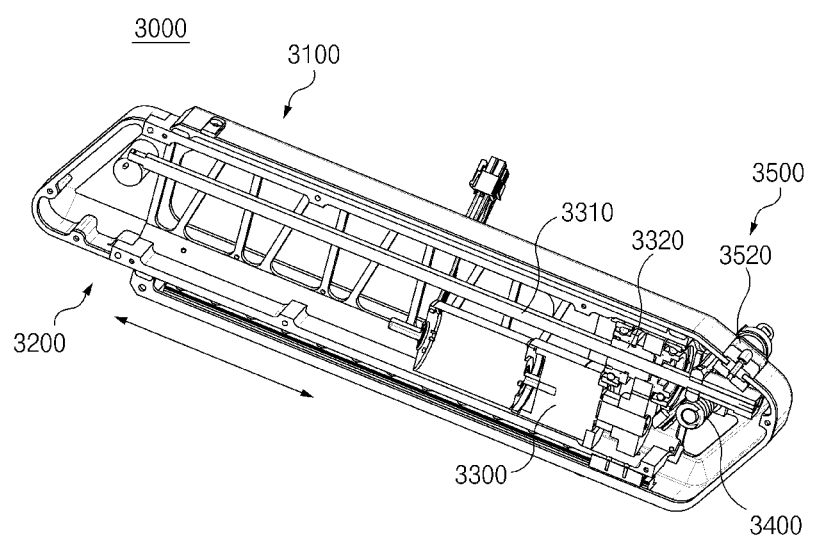
FIG. 7 is a view illustrating a cross-section of an internal structure of the handle unit of the seating device according to embodiments of the present disclosure.
Figure 8:
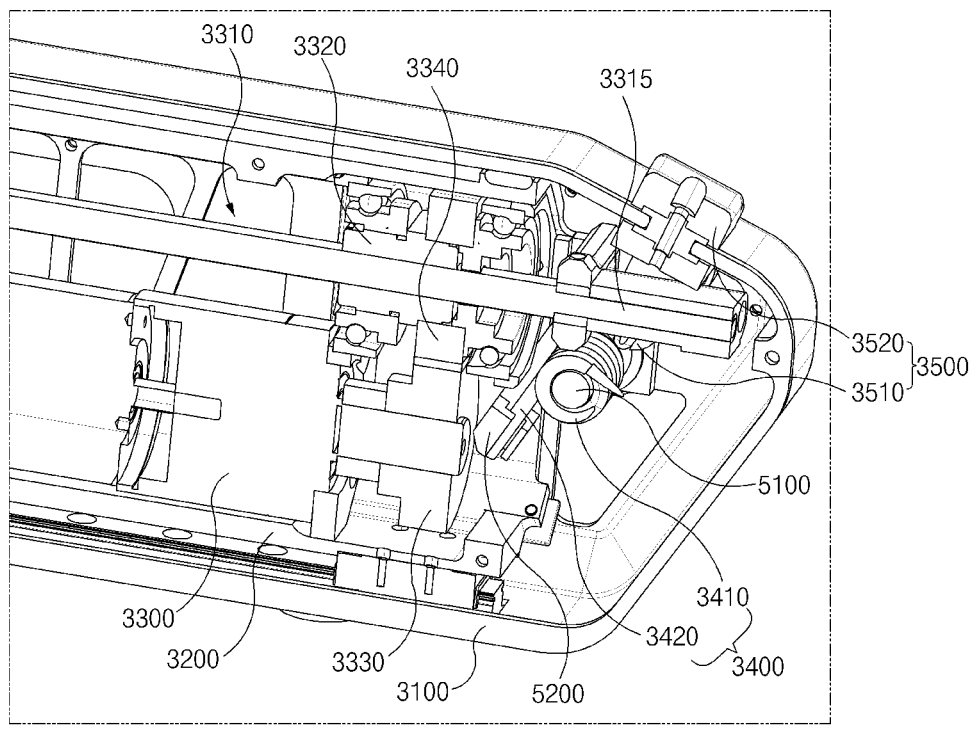
FIG. 8 is a view illustrating a torsion spring member and components around the torsion spring member of the handle unit of the seating device according to embodiments of the present disclosure when viewed in a first direction.
Figure 9:
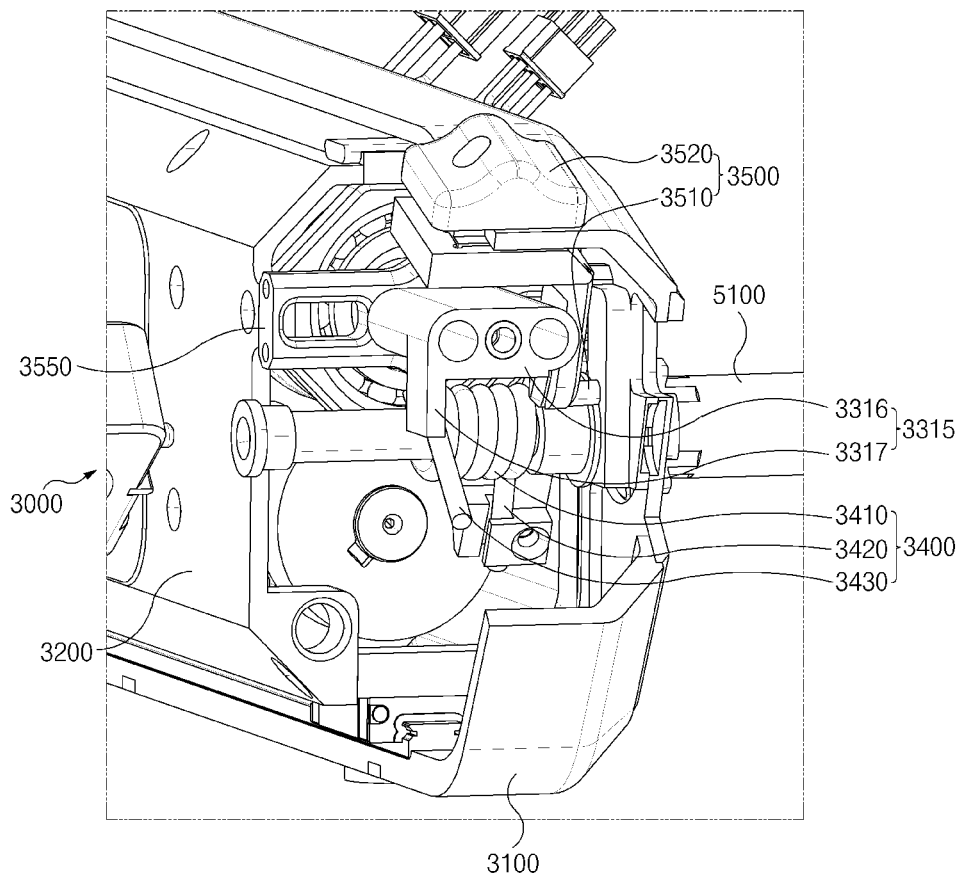
FIG. 9 is a view illustrating the torsion spring member and the components around the torsion spring member of the handle unit of the seating device according to embodiments of the present disclosure when viewed in a second direction.
Figure 10:
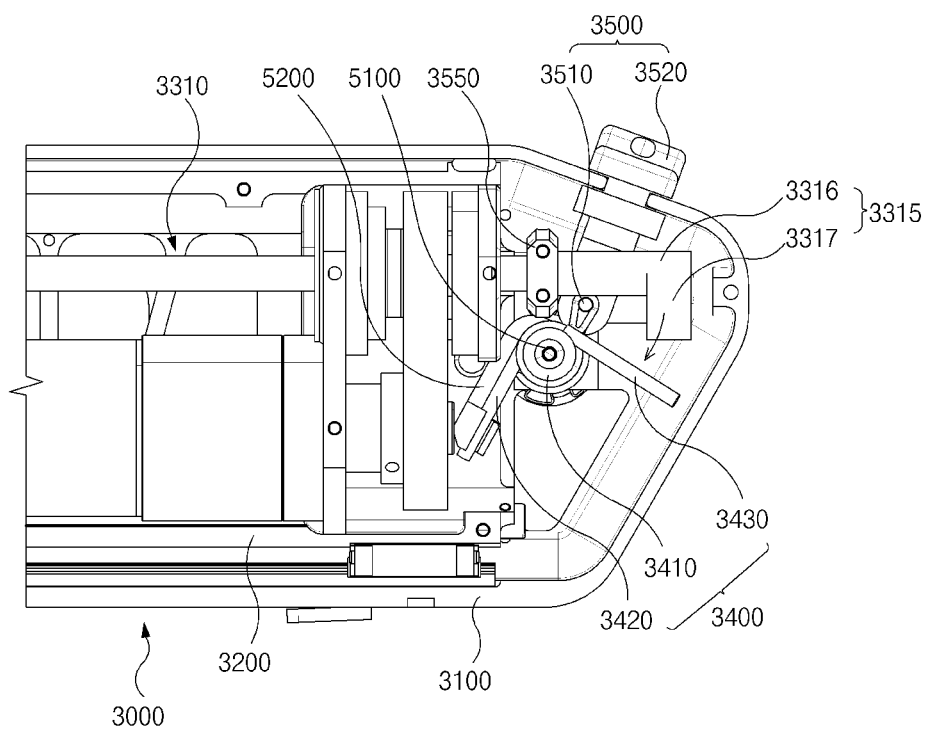
FIG. 10 is a view illustrating the torsion spring member and the components around the torsion spring member of the handle unit of the seating device according to embodiments of the present disclosure when viewed in a third direction.

FIG. 3 is a perspective view illustrating the handle unit of the seating device according to embodiments of the present disclosure, and FIG. 4 is a perspective view illustrating the handle unit in a state in which a clutch fixing module illustrated in FIG. 3 is removed. FIG. 5 is a view illustrating a cross-section in a state in which the clutch fixing module is coupled to a fixing handle body region of the handle unit of the seating device according to embodiments of the present disclosure, and FIG. 6 is a perspective view illustrating the clutch fixing module provided on the handle unit of the seating device according to embodiments of the present disclosure. FIG. 7 is a view illustrating a cross-section of an internal structure of the handle unit of the seating device according to embodiments of the present disclosure, and FIG. 8 is a view illustrating a torsion spring member and components around the torsion spring member of the handle unit of the seating device according to embodiments of the present disclosure when viewed in a first direction. FIG. 9 is a view illustrating the torsion spring member and the components around the torsion spring member of the handle unit of the seating device according to embodiments of the present disclosure when viewed in a second direction, and FIG. 10 is a view illustrating the torsion spring member and the components around the torsion spring member of the handle unit of the seating device according to embodiments of the present disclosure when viewed in a third direction.

Referring to FIGS. 3, 4, 7, and 8, the handle unit 3000 may include a fixing handle body region 3100 having one side coupled to the frame unit 1000 and provided to be rotatable relative to the frame unit 1000, and a lifting handle body region 3200 having one side coupled to the fixing handle body region 3100 and provided to be rectilinearly movable relative to the fixing handle body region 3100.

The lifting handle body region 3200 may be configured to assist the user in sitting on the seating device 10 or rising from the seating device 10 by moving upward from the fixing handle body region 3100 when the user seated on the seating device 10 intends to rise from the seating device 10 or the user intends to sit on the seating device 10.

Components may be provided in the handle unit 3000 to generate power for moving the lifting handle body region 3200 and transmit the power to the lifting handle body region 3200.

More specifically, as illustrated in FIGS. 8 to 10, the handle unit 3000 may further include a motor 3300 including a rotary shaft, a screw member 3310 having a screw thread region formed on an outer portion thereof, and a nut member 3320 coupled to the screw thread region of the screw member 3310 and configured to rotate by receiving power from the motor 3300.

In this case, according to embodiments of the present disclosure, the screw member 3310 may be fixedly coupled so as not to move relative to the fixing handle body region 3100. The nut member 3320 may be coupled so as to be rotatable relative to the lifting handle body region 3200 but not perform a translational motion relative to the lifting handle body region 3200. Therefore, when the nut member 3320 rotates as the motor 3300 operates, the nut member 3320 coupled to the screw thread region of the screw member 3310 performs the translational motion while performing the rotational motion by means of a coupling relationship with the screw member 3310. Therefore, according to embodiments of the present disclosure, the lifting handle body region 3200 may perform the translational motion in two opposite directions relative to the fixing handle body region 3100 by means of the translational motion of the nut member 3320. For example, as illustrated in FIGS. 7 and 8, the handle unit 3000 may include a first gear 3330 configured to engage with the rotary shaft of the motor 3300, and a second gear 3340 configured to engage with the first gear 3330 and the nut member 3320. Therefore, a rotational force of the motor 3300 may be transmitted to the nut member 3320 sequentially through the first gear 3330 and the second gear 3340.

Therefore, in a situation in which the lifting handle body region 3200 assists the user in sitting on the seating device 10 or rising from the seating device 10, the lifting handle body region 3200 moves away from the fixing handle body region 3100 and the frame unit 1000. After the user sits on or rises from the seating device 10 completely, the lifting handle body region 3200 moves toward the fixing handle body region 3100 and the frame unit 1000 and returns to an original position.

Meanwhile, as described above, according to embodiments of the present disclosure, the fixing handle body region 3100 may be rotatable relative to the frame unit 1000. More specifically, the seating device 10 according to embodiments of the present disclosure may further include a connection rotary shaft 5100 having one side configured to penetrate the fixing handle body region 3100 and the other side configured to penetrate the leg region 1200. Therefore, the fixing handle body region 3100 may rotate about the connection rotary shaft 5100 relative to the frame unit 1000.

In addition, according to embodiments of the present disclosure, the seating device 10 may provide a restoring rotational force to the handle unit 3000 when the handle unit 3000 rotates out of a predetermined range relative to the frame unit 1000, thereby reducing an effort required for the user to rotate the handle unit 3000 to an original position.

More specifically, the handle unit 3000 may further include a torsion spring member 3400 including a winding region 3410 having a winding shape in a circumferential direction, a first spring extension region 3420 extending from one side of the winding region 3410, and a second spring extension region 3430 extending from the other side of the winding region 3410. The torsion spring member 3400 may be configured to provide a rotational restoring force in a direction opposite to a direction in which the handle unit 3000 rotates when the handle unit 3000 rotates out of the predetermined range relative to the frame unit 1000. More specifically, the connection rotary shaft 5100 may be inserted into and coupled to the winding region 3410 of the torsion spring member 3400. Meanwhile, regardless of the rotation of the handle unit 3000, the connection rotary shaft 5100 may be fixedly coupled to the frame unit 1000, and the torsion spring member 3400 may be fixedly coupled to the connection rotary shaft 5100.

In addition, as illustrated in FIGS. 7 and 8, the seating device 10 may further include a spring accommodation member 5200 protruding from the connection rotary shaft 5100 in a direction intersecting the direction (i.e., a horizontal direction based on the drawings) in which the connection rotary shaft 5100 extends. The spring accommodation member 5200 may have an internal space. In this case, the first spring extension region 3420 of the torsion spring member 3400 may be seated in the internal space of the spring accommodation member 5200. The spring accommodation member 5200 may be configured to support the first spring extension region 3420 so that the torsion spring member 3400 is fixed to the connection rotary shaft 5100.

Meanwhile, as illustrated in FIGS. 7 to 10, a part of the screw member 3310 may face the torsion spring member 3400. More specifically, the screw member 3310 may include a spring interference region 3315 facing the torsion spring member 3400. In this case, the spring interference region 3315 may be fixed to the fixing handle body region 3100. More specifically, the handle unit 3000 may further include an interference region fixing member 3550 having one side fixedly coupled to the spring interference region 3315 and the other side fixedly coupled to the fixing handle body region 3100. Referring to FIGS. 7 to 10, the screw member 3310 may penetrate the interference region fixing member 3550.

Therefore, according to embodiments of the present disclosure, when the handle unit 3000 rotates out of the predetermined range, the torsion spring member 3400 may be elastically deformed by being pressed by the spring interference region 3315, such that a force may be applied to the handle unit 3000 in a direction opposite to the rotation direction of the handle unit 3000.

More particularly, according to embodiments of the present disclosure, when the handle unit 3000 rotates within the predetermined range, the torsion spring member 3400 and the spring interference region 3315 are spaced apart from each other, such that the torsion spring member 3400 is not elastically deformed. However, when the handle unit 3000 rotates out of the predetermined range, the torsion spring member 3400 may be elastically deformed by being pressed by the spring interference region 3315.

More specifically, referring to FIGS. 9 and 10, the spring interference region 3315 may include an interference body portion 3316 facing the torsion spring member and configured to come into close contact with the second spring extension region 3430 when the fixing handle body region 3100 rotates relative to the chair region 1100 by an angle exceeding a predetermined angle. For example, based on FIGS. 9 and 10, when the fixing handle body region 310 rotates clockwise by an angle exceeding the predetermined angle, a lower surface of the interference body portion 3316 may come into close contact with the second spring extension region 3430, and the second spring extension region 3430 moves clockwise. In this case, the winding region 3410 is also wound clockwise, such that the torsion spring member 3400 presses the interference body portion 3316 counterclockwise. Therefore, the handle unit 3000 as well as the fixing handle body region 310 to which the interference body portion 3316 is fixedly coupled also receives a counterclockwise force.

Referring to FIGS. 9 and 10, the spring interference region 3315 may further include a configuration configured to interfere with the torsion spring member 3400 to prevent the torsion spring member 3400 from separating from the connection rotary shaft 5100. More specifically, the spring interference region 3315 may further include an interference guide portion 3317 protruding from the interference body portion 3316 and configured to surround an outer side of the second spring extension region 3430. For example, based on FIGS. 9 and 10, the second spring extension region 3430 may protrude in an approximately 4 o'clock direction, and the interference guide portion 3317 may have a shape extending and protruding downward from the interference body portion 3316. Therefore, according to embodiments of the present disclosure, when the torsion spring member 3400 moves in the horizontal direction in which the connection rotary shaft 5100 extends, the interference guide portion 3317 and the second spring extension region 3430 may interfere with each other, thereby preventing the torsion spring member 3400 from separating from the connection rotary shaft 5100.

Figure 11:
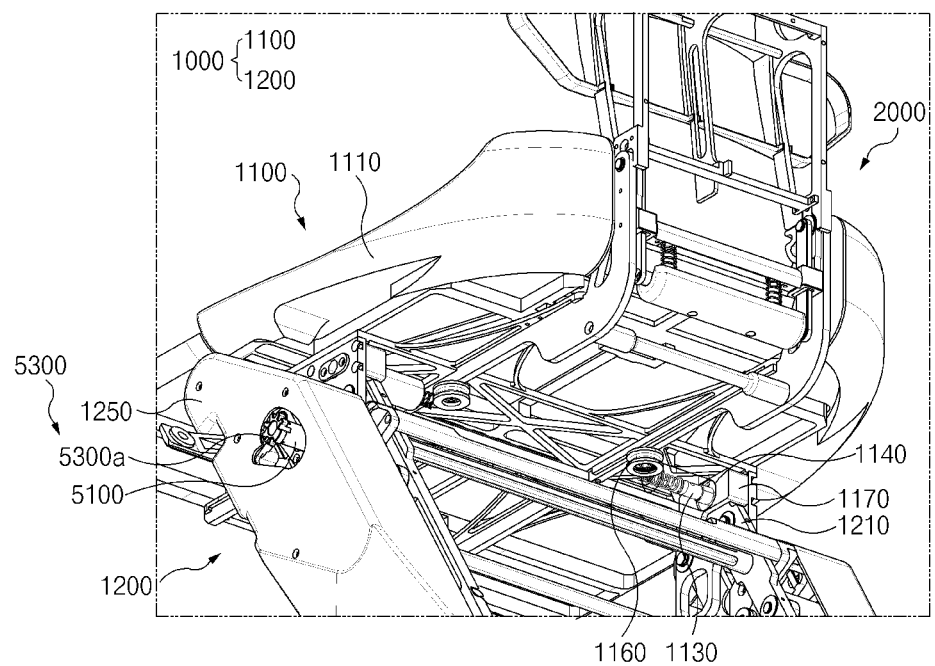
FIG. 11 is a view illustrating the frame unit of the seating device according to embodiments of the present disclosure when viewed from below.
Figure 12:
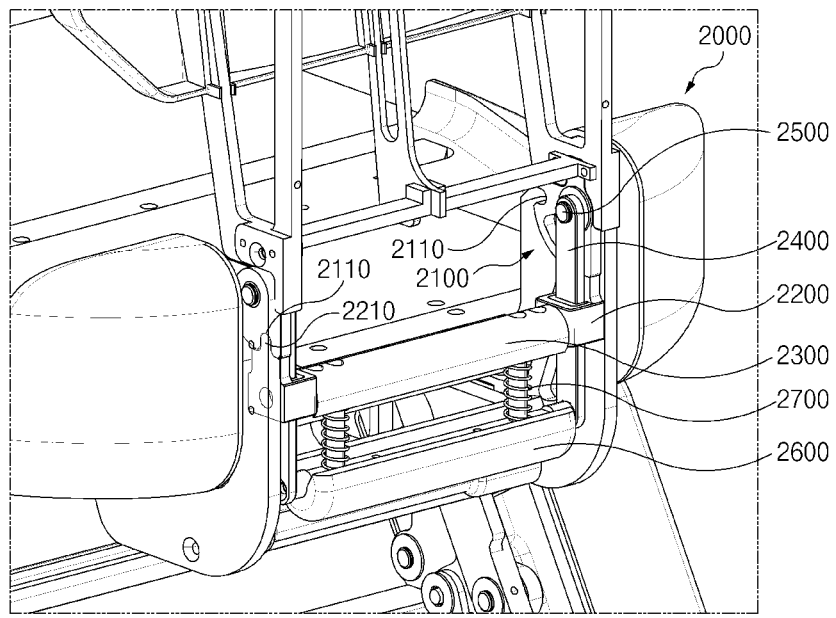
FIG. 12 is an enlarged perspective view of a coupling structure between the frame unit and a backrest unit of the seating device according to embodiments of the present disclosure.

FIG. 11 is a view illustrating the frame unit of the seating device according to embodiments of the present disclosure when viewed from below, and FIG. 12 is an enlarged perspective view of a coupling structure between the frame unit and a backrest unit of the seating device according to embodiments of the present disclosure.

Meanwhile, as illustrated in FIG. 11, the seating device 10 according to embodiments of the present disclosure may further include a peripheral recessed member 5300 disposed outside the connection rotary shaft 5100 and having a plurality of recessed sections 5300a disposed in a circumferential direction of the connection rotary shaft 5100 and each having a shape recessed toward the connection rotary shaft 5100. In addition, as illustrated in FIGS. 8 and 9, the handle unit 3000 may further include a coupling module 3500 including a pin member 3510 provided to be movable so as to be inserted into the recessed section 5300a or spaced apart from the recessed section 5300a in the horizontal direction.

The coupling module 3500 may be configured to adjust a coupling angle between the handle unit 3000 and the frame unit 1000. That is, according to embodiments of the present disclosure, i) the pin member 3510 is moved in the horizontal direction so as to be spaced apart from the recessed section 5300a, ii) the handle unit 3000 is rotated by a desired angle, and then iii) the pin member 3510 is inserted into the recessed section 5300a again, such that the coupling angle between the handle unit 3000 and the frame unit 1000 may be adjusted.

Furthermore, as illustrated in FIGS. 8 and 9, the coupling module 3500 may further include a rotation locking button member 3520 coupled to the fixing handle body region 3100, provided to be movable relative to the fixing handle body region 3100 in the horizontal direction, and fixedly coupled to the pin member 3510. The rotation locking button member 3520 may be configured to enable the user to manually couple or decouple the fixing handle body region and the peripheral recessed member 5300 by moving the pin member 3510. Therefore, according to embodiments of the present disclosure, the pin member 3510 may be inserted into the recessed section 5300a of the peripheral recessed member 5300 or spaced apart from the recessed section 5300a by the movement of the rotation locking button member 3520 relative to the fixing handle body region 3100.

Meanwhile, referring to FIGS. 3 to 6, the handle unit 3000 may further include a clutch fixing module 3600 configured to fix a clutch, which assists the user in walking, to the fixing handle body region 3100. More specifically, the clutch fixing module 3600 may be detachably provided on the fixing handle body region 3100.

Referring to FIGS. 3 to 6, the clutch fixing module 3600 may include a fixing module body region 3610 having a through-hole 3610a into which the clutch may be inserted, a fixing pin region 3620 protruding from the fixing module body region 3610 toward the fixing handle body region 3100, and first interference regions 3630 each having one side connected to the fixing pin region 3620 and having a shape extending from one side in a direction away from the fixing pin region 3620.

In addition, the fixing handle body region 3100 may include a pin insertion hole 3110 formed in a surface of the fixing handle body region 3100 and configured such that the fixing pin region 3620 is inserted into the pin insertion hole 3110 and second interference regions 3120 each having a shape extending in a direction away from the pin insertion hole 3110 and protruding toward the clutch fixing module 3600.

Therefore, according to embodiments of the present disclosure, the fixing pin region 3620 may be inserted into the pin insertion hole 3110, such that the clutch fixing module 3600 and the fixing handle body region 3100 may be coupled to each other. The interference between the first interference regions 3630 and the second interference regions 3120 may restrict the rotation of the clutch fixing module 3600 relative to the fixing handle body region 3100, thereby preventing the clutch fixing module 3600 from slipping relative to the fixing handle body region 3100.

Furthermore, the clutch fixing module 3600 may further include a first magnet 3640 disposed adjacent to the fixing pin region 3620. The fixing handle body region 3100 may further include a second magnet 3130 facing the first magnet 3640 when the fixing pin region 3620 is inserted into the pin insertion hole 3110. Therefore, the clutch fixing module 3600 may be stably attached to the fixing handle body region 3100 by an attractive force between the first magnet 3640 and the second magnet 3130. For example, as illustrated in FIG. 5, the first magnet 3640 may be provided at a rear side of the fixing pin region 3620, and the second magnet 3130 may be provided in a peripheral region of the pin insertion hole 3110.

Meanwhile, referring to FIG. 4, the fixing handle body region 3100 may further include guide regions 3140 spaced apart from the second interference regions 3120 in a circumferential direction A of the pin insertion hole 3110 and protruding toward the clutch fixing module 3600. In this case, the guide region 3140 may have a shape having a height at which the guide region 3140 protrudes outward, and the height may vary depending on positions in the circumferential direction A of the pin insertion hole 3110. More particularly, the height at which the guide region 3140 protrudes outward may decrease toward two opposite ends based on the circumferential direction A of the pin insertion hole 3110. This configuration may be understood as meaning that the guide region 3140 has an inclined shape in the circumferential direction A.

In a case in which the fixing handle body region 3100 and the clutch fixing module 3600 are disposed within a predetermined distance, the clutch fixing module 3600 may be rapidly attached to the fixing handle body region 3100 by the attractive force between the first magnet 3640 and the second magnet 3130. In this case, there is a problem in that a large amount of noise occurs, and the user may be injured.

The guide regions 3140 may be configured to prevent the above-mentioned problem. That is, according to embodiments of the present disclosure, to couple the clutch fixing module 3600 to the fixing handle body region 3100, the user may insert the fixing pin region 3620 into the pin insertion hole 3110, attach the first interference regions 3630 to central portions of the guide regions 3140 based on the circumferential direction A, and then rotate the clutch fixing module 3600, such that the first interference regions 3630 may move downward along the inclined regions of the guide regions 3140. In this case, the fixing handle body region 3100 and the clutch fixing module 3600 may be gradually coupled to each other, which makes it possible to reduce noise and prevent an injury to the user.

Meanwhile, the clutch fixing module 3600 may further include a bolt member 3650 protruding from the fixing module body region 3610 toward the fixing handle body region 3100 and a bolt rotating member 3660 connected to the bolt member 3650 and configured to rotate the bolt member 3650. In addition, the fixing handle body region 3100 may further include a fixing handle nut member 3150 provided on a surface of the fixing handle body region 3100 and coupled to the bolt member 3650 by a bolt-nut engagement. In this case, in addition to the coupling of the fixing pin region 3620 to the pin insertion hole 3110, the fixing handle body region 3100 and the clutch fixing module 3600 may be additionally coupled, such that the clutch fixing module 3600 may be more securely and fixedly coupled to the fixing handle body region 3100.

Meanwhile, referring to FIGS. 11 and 12, the backrest unit 2000 may be rotatable relative to the frame unit 1000.

More specifically, the backrest unit 2000 may include first concave-convex members 2100 each having a first concave-convex region 2110, second concave-convex members 2200 each having a second concave-convex region 2210 having a shape corresponding to the first concave-convex region 2110, a first handle member 2300 fixedly coupled to the second concave-convex members 2200, rod members 2400 each configured to penetrate the second concave-convex member 2200 and guide a movement direction of the second concave-convex member 2200, and backrest unit rotary shafts 2500 each configured to penetrate the first concave-convex member 2100 and the rod member 2400.

More specifically, the second concave-convex member 2200 may be movable in a direction in which the rod member 2400 extends, and the first concave-convex member 2100 and the rod member 2400 may be rotatable about the backrest unit rotary shaft 2500. Therefore, according to embodiments of the present disclosure, the user may fold or unfold the backrest unit 2000 by rotating the first concave-convex members 2100 and the rod members 2400 about the backrest unit rotary shafts 2500.

More particularly, the backrest unit 2000 may further include a second handle member 2600 spaced apart from the first handle member 2300 in the direction in which the rod member 2400 extends, and fixedly coupled to the rod members 2400, and handle elastic members 2700 disposed between the first handle member 2300 and the second handle member 2600 and configured to support the first handle member 2300 and the second handle member 2600. FIGS. 11 and 12 illustrate that the second handle member 2600 is spaced apart downward from the first handle member 2300.

Embodiments of the present disclosure will be described with reference to the above-mentioned description. The first handle member 2300 and the second handle member 2600 are kept spaced apart from each other by elastic forces of the handle elastic members 2700. Therefore, the first concave-convex regions 2110 and the second concave-convex regions 2210 may be kept coupled to each other, such that the backrest unit 2000 is kept fixed without rotating relative to the frame unit 1000, i.e., the chair region 1100.

When the user moves the first handle member 2300 toward the second handle member 2600 with an effort higher than the elastic forces of the handle elastic members 2700, the second concave-convex members 2200 fixedly coupled to the first handle member 2300 are also moved toward the second handle member 2600, such that the first concave-convex members 2100 and the second concave-convex members 2200 are decoupled. Therefore, the backrest unit 2000 may be rotatable relative to the frame unit 1000, and the user may fold or unfold the backrest unit 2000.

More particularly, as illustrated in FIG. 12, the first concave-convex region 2110 of the first concave-convex member 2100 may be provided in plural, and the plurality of first concave-convex regions 2110 may be disposed in a circumferential direction of the backrest unit rotary shaft 2500 so that the backrest unit 2000 is kept folded with respect to the frame unit 1000 or the backrest unit 2000 is kept unfolded with respect to the frame unit 1000 by the operation of the user. FIG. 12 illustrates that the first concave-convex member 2100 has two first concave-convex regions 2110. Therefore, as illustrated in FIG. 12, when the second concave-convex region 2210 is coupled to one of the two first concave-convex regions 2110, the backrest unit 2000 may be kept unfolded with respect to the frame unit 1000. On the contrary, when the second concave-convex region 2210 is coupled to the other of the two first concave-convex regions 2110, the backrest unit 2000 may be kept folded with respect to the frame unit 1000.

Figure 13:
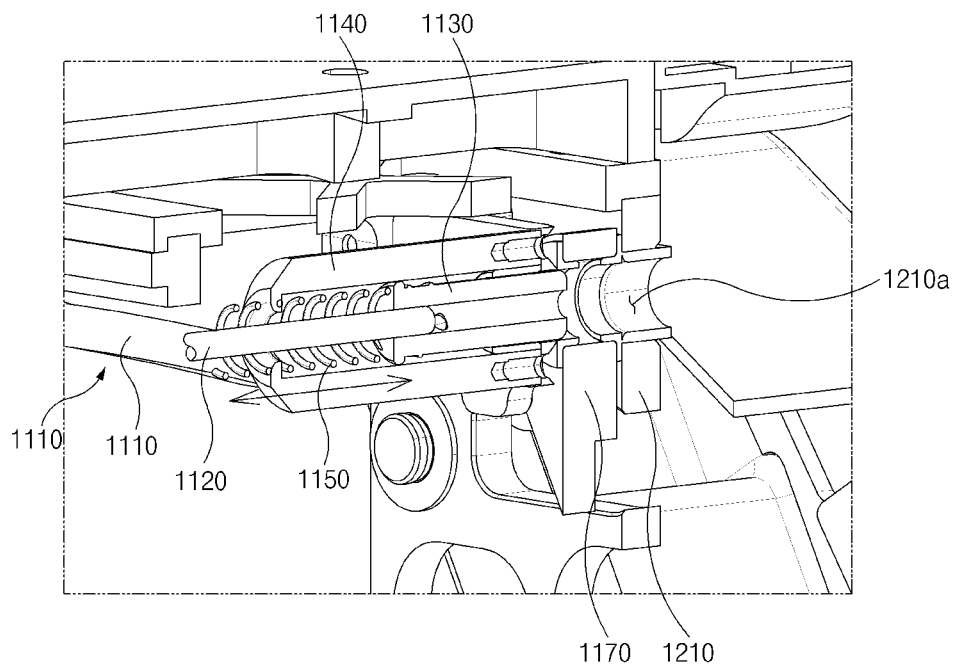
FIG. 13 is a view illustrating a cross-section of a coupling structure between a chair region and a leg region of the seating device according to embodiments of the present disclosure.
Figure 14:
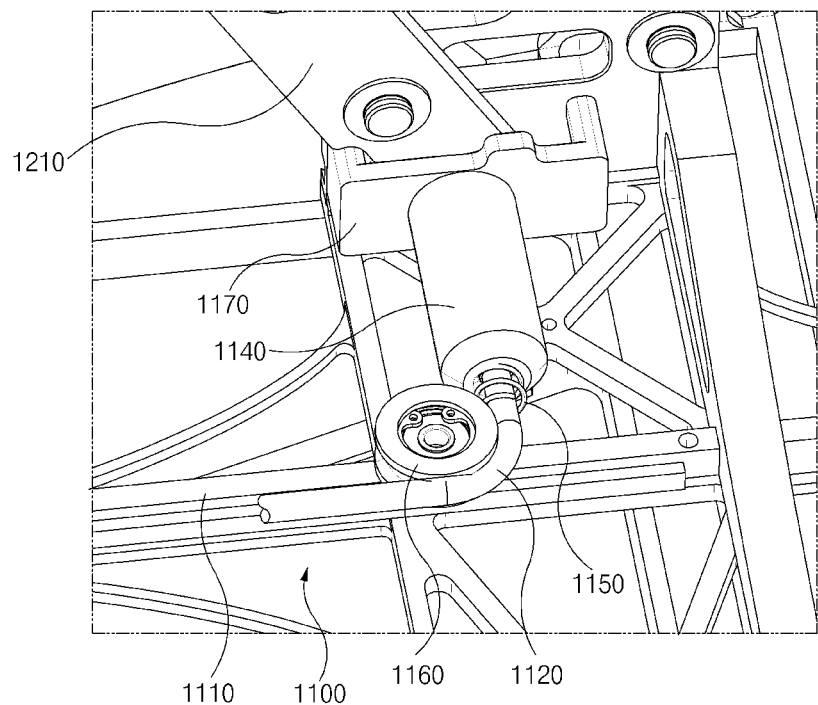
FIG. 14 is a view illustrating the coupling structure between the chair region and the leg region of the seating device according to embodiments of the present disclosure when viewed from below.

Meanwhile, as illustrated in FIGS. 13 and 14, the chair region 1100 of the frame unit 1000 may include a chair frame 1110 having a shape extending in the horizontal direction, a wire member 1120 having one side fixed to the second handle member 2600, a wire fixing pin member 1130 to which the other side of the wire member 1120 is fixed, and a pin accommodation member 1140 fixedly coupled to the chair frame 1110, configured to accommodate the wire fixing pin member 1130, and having an internal space in which the wire fixing pin member 1130 is movable in the horizontal direction. The leg region 1200 may have a link hole 1210a into which the pin accommodation member 1140 is inserted. In addition, the chair region 1100 may further include a pin pressing elastic member 1150 disposed in the pin accommodation member 1140 and configured to press the wire fixing pin member 1130 toward a first link 1210. In addition, the wire member 1120 may be configured to pull the wire fixing pin member 1130 in a direction opposite to the direction in which the pin pressing elastic member 1150 presses the wire fixing pin member 1130.

The wire member 1120, the wire fixing pin member 1130, the pin accommodation member 1140, and the pin pressing elastic member 1150 may be components configured to fold or unfold the leg region 1200 with respect to the chair region 1100 in conjunction with the operation of folding or unfolding the backrest unit 2000 with respect to the frame unit 1000. Therefore, the seating device 10 according to embodiments of the present disclosure has the structure that may be folded or unfolded by the user's intention, which makes it possible to reduce a volume when the seating device 10 is not used. Further, when the leg region 1200 is also folded as the backrest unit 2000 is folded, a space in which an item may be loaded may be formed in an upper region of the seating device 10. Therefore, the seating device 10 may serve as a mobility vehicle for transporting the item.

That is, referring to FIGS. 13 and 14, in a state in which the backrest unit 2000 is unfolded with respect to the frame unit 1000, the wire fixing pin member 1130 may be inserted into the link hole 1210a formed in the first link 1210 by an elastic force of the pin pressing elastic member 1150, such that the leg region 1200 may also be kept unfolded with respect to the chair region 1100.

Thereafter, when the backrest unit 2000 is folded toward the frame unit 1000, the second handle member 2600 moves upward while rotating about the backrest unit rotary shafts 2500, and the wire member 1120 having one side fixed to the second handle member 2600 also moves upward. Therefore, as the tension of the wire member 1120 increases, the wire member 1120 may pull the wire fixing pin member 1130, the wire fixing pin member 1130 may separate from the link hole 1210a, and the chair region 1100 and the leg region 1200 may be decoupled, such that the leg region 1200 is rotatable relative to the chair region 1100.

In contrast, in a state in which the backrest unit 2000 is unfolded with respect to the frame unit 1000, the wire fixing pin member 1130 may be inserted into the link hole 1210a of the first link 1210 by the elastic forces of the handle elastic members 2700, such that the chair region 1100 and the leg region 1200 are kept coupled in the state in which the leg region 1200 is unfolded.

Meanwhile, referring to FIG. 11, the chair region 1100 may further include a pulley member 1160 fixedly coupled to the chair frame 1110 and provided between the wire fixing pin member 1130 and the second handle member 2600 based on the direction in which the wire member 1120 extends. The wire member 1120 is bent around the pulley member 1160. The pulley member 1160 may rotate as the wire member 1120 moves.

Meanwhile, as illustrated in FIGS. 13 and 14, the chair region 1100 may further include a support member 1170 provided between the pin accommodation member 1140 and the first link 1210 and fixedly coupled to the chair frame 1110. In this case, the pin accommodation member 1140 may be fixedly coupled to the support member 1170. For example, a cross-section of the support member 1170 in the horizontal direction may have an approximately U shape, and the first link 1210 may be inserted into a space formed between the support member 1170 and the chair frame 1110.

Figure 15:
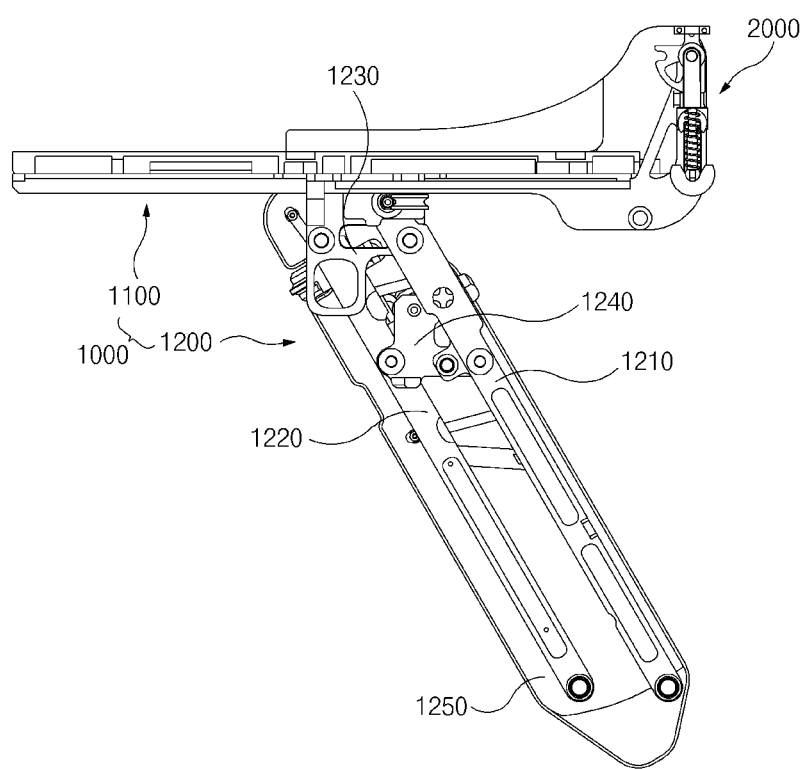
FIG. 15 is a side view illustrating the leg region of the frame unit of the seating device according to embodiments of the present disclosure.

FIG. 15 is a side view illustrating the leg region of the frame unit of the seating device according to embodiments of the present disclosure.

Referring to FIG. 15, the leg region 1200 may further include other links in addition to the first link 1210. More specifically, the leg region 1200 may further include a second link 1220 spaced apart from the first link 1210 in a forward/rearward direction and provided in parallel with the first link 1210, a third link 1230 having one side rotatably coupled to the first link 1210 and the other side rotatably coupled to the second link 1220, and a leg cover 1250 configured to surround outer sides of the first to third links 1210, 1220, and 1230 and configured such that the other side of the first link 1210 and the other side of the second link 1220 are rotatably coupled to the leg cover 1250. For example, the first link 1210 and the second link 1220 may be coupled to a lower region of the leg cover 1250. Therefore, when the wire fixing pin member 1130 is moved away from the link hole 1210a and the leg region 1200 is folded toward the chair region 1100, the first link 1210 is rotated, and the leg cover 1250 and the second and third links 1220 and 1230 rotatably coupled to the first link 1210 are also folded toward the chair region 1100.

Referring to FIG. 15, the leg region 1200 may further include a fourth link 1240 having one side rotatably coupled to the first link 1210 and the other side rotatably coupled to the second link 1220, the fourth link 1240 being spaced apart from the third link 1230 in an upward/downward direction.

In addition, the link hole 1210a formed in the first link 1210 may be formed above a region in which the first link 1210 and the third link 1230 are coupled. The third link 1230 may be provided above the fourth link 1240. However, the coupling relationship and the positional relationship between the first to fourth links 1210, 1220, 1230, and 1240 are not limited to the above-mentioned description, and various coupling relationships and various positional relationships may be applied. Meanwhile, the connection rotary shaft 5100 (see FIG. 11) may be coupled to the first link 1210.

Figure 16:
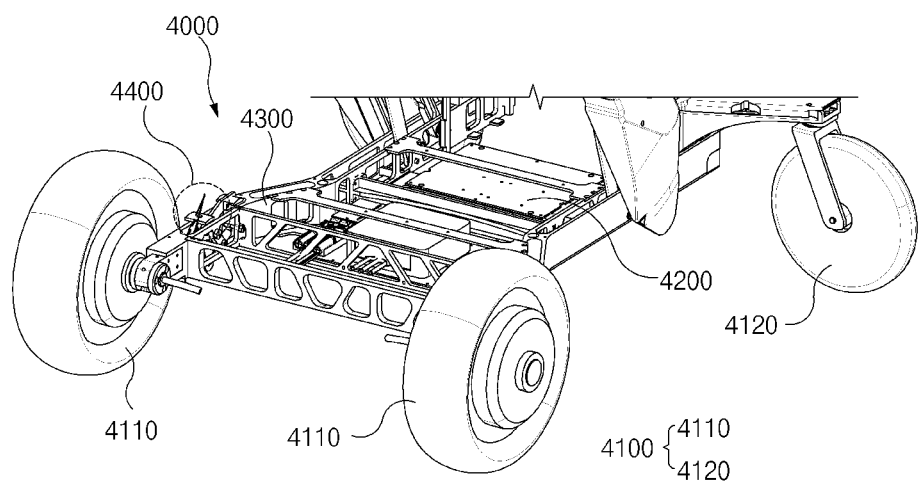
FIG. 16 is a perspective view illustrating a drive unit of the seating device according to embodiments of the present disclosure.
Figure 17:
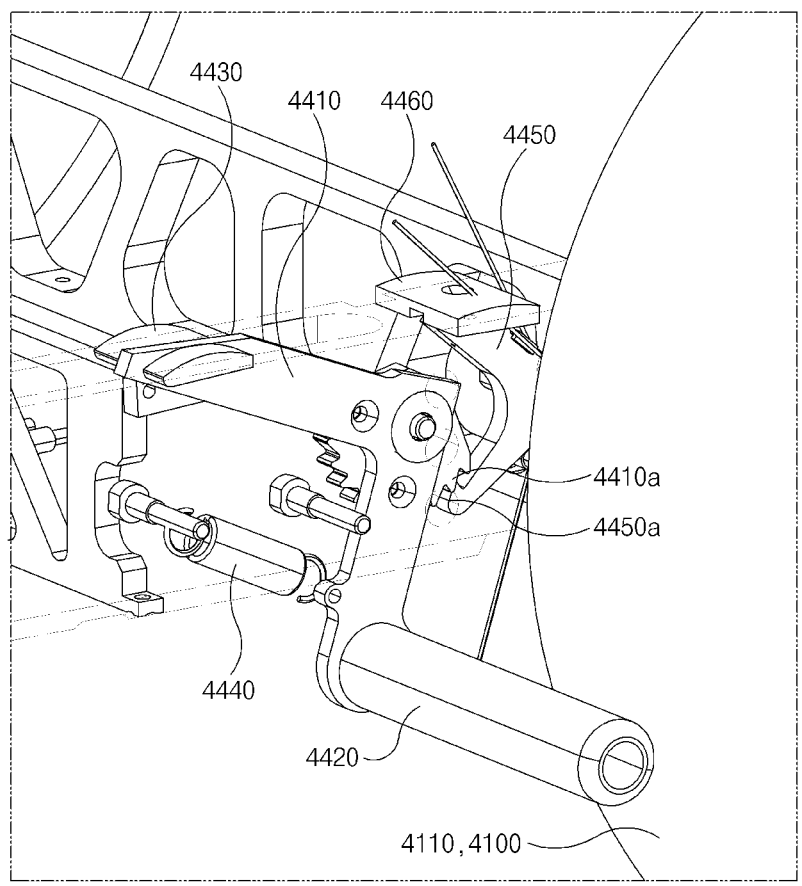
FIG. 17 is an enlarged perspective view illustrating a brake unit provided in the drive unit of the seating device according to embodiments of the present disclosure.

FIG. 16 is a perspective view illustrating the drive unit of the seating device according to embodiments of the present disclosure, and FIG. 17 is an enlarged perspective view illustrating a brake unit provided in the drive unit of the seating device according to embodiments of the present disclosure.

Referring to FIGS. 16 and 17, the drive unit 4000 may further include a drive body 4300 having one side rotatably coupled to the leg region 1200 and the other side coupled to the wheel 4100, and a brake unit 4400 coupled to one side of the drive body 4300. The brake unit 4400 may be configured to brake the wheel 4100 being rotated.

More specifically, the brake unit 4400 may include a brake link 4410 having one side rotatably coupled to the drive body 4300, and a brake pad 4420 coupled to one side of the brake link 4410 and configured to come into contact with the wheel 4100 or move away from the wheel 4100 as the brake link 4410 rotates. Therefore, when the brake pad 4420 comes into contact with the wheel 4100, the wheel 4100 may be braked by a frictional force between the wheel 4100 and the brake pad 4420. The wheels 4100 may include front wheels 4110 coupled to a front region of the drive body 4300 and configured to directly rotate by receiving power from the power source 4200, and rear wheels 4120 coupled to a rear region of the drive body 4300 and provided to be rotatable and steerable without receiving power. The brake unit 4400 may be configured to brake the front wheel 4110.

In addition, the brake unit 4400 may include a first button member 4430 coupled to an upper region of the brake link 4410 and configured to move the brake pad 4420 toward the wheel 4100 when the first button member 4430 is pressed downward and the brake link 4410 rotates. Therefore, the user may brake the wheel 4100 by pressing the first button member 4430 downward.

In addition, the brake unit 4400 may further include a brake releasing member 4440 having one side coupled to the drive body 4300 and the other side coupled to the brake link 4410, the brake releasing member 4440 being configured to pull the brake pad 4420 in a direction away from the wheel 4100. For example, the brake releasing member 4440 may be a spring member configured to provide an elastic force. Therefore, when the user does not press the first button member 4430, the brake link 4410 may be pulled by the brake releasing member 4440, and the brake pad 4420 may be spaced apart from the wheel 4100.

Meanwhile, even in a case in which the user does not press the first button member 4430, the brake pad 4420 of the brake unit 4400 may be in close contact with the wheel 4100, such that the wheel 4100 may be kept in a locked state and a parked state.

To this end, the brake unit 4400 may further include a parking link 4450 rotatably coupled to the drive body 4300 and configured to come into contact with the brake link 4410 when the brake link 4410 rotates by a predetermined rotation angle or more. In addition, a first ratchet region 4410a having a concave-convex shape may be formed in a region of the brake link 4410 which is configured to come into contact with the parking link 4450, and a second ratchet region 4450a having a shape corresponding to the first ratchet region 4410a may be formed in a region of the parking link 4450 which is configured to come into contact with the brake link 4410.

Therefore, when the first ratchet region 4410a and the second ratchet region 4450a are coupled to each other, the brake pad 4420 may be kept in close contact with the wheel 4100 even though the brake link 4410 is not rotated by the first button member 4430.

More particularly, the brake unit 4400 may further include a second button member 4460 provided in an upper region of the parking link 4450 and configured to move the parking link 4450 away from the brake link 4410 when the second button member 4460 is pressed downward and the parking link 4450 rotates. Like the first button member 4430, the second button member 4460 may be configured to allow the user to manually rotate the parking link 4450. That is, when the second button member 4460 is pressed downward, the parking link 4450 may rotate, and the first ratchet region 4410a and the second ratchet region 4450a may be decoupled, such that the parked state may be released.

Meanwhile, as illustrated in FIG. 17, the brake link 4410 may include a shape that extends from the region coupled to the first button member 4430 to the region rotatable relative to the drive body 4300 and then is bent and extends to the region coupled to the brake pad 4420. It may be understood that the brake link 4410 has an approximately L shape.

In addition, the parking link 4450 may include a shape that extends from the region coupled to the second button member 4460 to the region rotatable relative to the drive body 4300 and then is bent and extends to the region having the second ratchet region 4450a. It may be understood that the parking link 4450 also has an approximately L shape.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A seating device comprising:
   a frame unit comprising a chair region capable of supporting a user and a leg region extending downward from the chair region;
   a backrest unit disposed at a rear side of the frame unit; and
   a handle unit coupled to a first side of the frame unit, the handle unit comprising:
      a fixing handle body region having a first side coupled to the frame unit and rotatable relative to the frame unit; and
      a lifting handle body region having a first side coupled to the fixing handle body region and rectilinearly movable relative to the fixing handle body region,
      a motor comprising a rotary shaft;
      a screw member having a screw thread region formed on an outer portion thereof, the screw member being fixedly coupled to the fixing handle body region; and
      a nut member coupled to the screw thread region of the screw member and configured to rotate by receiving power from the motor, the nut member being rotatably coupled to the lifting handle body region.

2. The seating device of claim 1,
   wherein the lifting handle body region is configured to perform a translational motion relative to the fixing handle body region using a translational motion of the nut member.

3. The seating device of claim 2, further comprising a connection rotary shaft having a first side configured to penetrate the fixing handle body region and a second side configured to penetrate the leg region;
   wherein the handle unit further comprises a torsion spring member comprising a winding region, a first spring extension region extending from a first side of the winding region, and a second spring extension region extending from a second side of the winding region; and
   wherein the connection rotary shaft is inserted into and coupled to the winding region.

4. The seating device of claim 3, further comprising a spring accommodation member protruding from the connection rotary shaft in a direction intersecting a direction in which the connection rotary shaft extends, wherein the first spring extension region of the torsion spring member is seated in an internal space of the spring accommodation member.

5. The seating device of claim 3, wherein:
   the screw member comprises a spring interference region configured to face the torsion spring member; and
   the handle unit further comprises an interference region fixing member having a first side fixedly coupled to the spring interference region and a second side fixedly coupled to the fixing handle body region.

6. The seating device of claim 5, wherein the spring interference region comprises an interference body portion facing the torsion spring member and configured to come into close contact with the second spring extension region when the fixing handle body region rotates relative to the chair region by an angle exceeding a predetermined angle.

7. The seating device of claim 6, wherein the spring interference region further comprises an interference guide portion protruding from the interference body portion and surrounding an outer side of the second spring extension region.

8. The seating device of claim 3, further comprising a peripheral recessed member disposed outside the connection rotary shaft and having a plurality of recessed sections disposed in a circumferential direction of the connection rotary shaft, each of the recessed sections having a shape recessed toward the connection rotary shaft, wherein the handle unit further comprises a coupling module comprising a pin member rotatable so as to be inserted into the recessed sections or spaced apart from the recessed sections.

9. The seating device of claim 8, wherein:
the coupling module further comprises a rotation locking button member coupled to the fixing handle body region, movable relative to the fixing handle body region, and fixed to the pin member; and
the pin member is inserted into the recessed sections or spaced apart from the recessed sections by a movement of the rotation locking button member relative to the fixing handle body region.

10. A seating device comprising:
a frame unit comprising a chair region capable of supporting a user and a leg region extending downward from the chair region;
a backrest unit disposed at a rear side of the frame unit; and
a handle unit coupled to a first side of the frame unit, the handle unit comprising:
a fixing handle body region having a first side coupled to the frame unit and rotatable relative to the frame unit; and
a lifting handle body region having a first side coupled to the fixing handle body region and rectilinearly movable relative to the fixing handle body region, wherein the handle unit further comprises a clutch fixing module detachably provided on the fixing handle body region, the clutch fixing module comprising:
a fixing module body region having a through-hole formed therein;
a fixing pin region protruding from the fixing module body region toward the fixing handle body region; and
a first interference region having a first side connected to the fixing pin region and having a shape extending from a second side in a direction away from the fixing pin region; and
wherein the fixing handle body region comprises:
a pin insertion hole formed in a surface of the fixing handle body region and configured such that the fixing pin region is inserted into the pin insertion hole; and
a second interference region having a shape extending in a direction away from the pin insertion hole and protruding toward the clutch fixing module.

11. The seating device of claim 10, wherein the clutch fixing module further comprises a first magnet disposed adjacent to the fixing pin region, and the fixing handle body region further comprises a second magnet configured to face the first magnet when the fixing pin region is inserted into the pin insertion hole.

12. The seating device of claim 10, wherein:
the fixing handle body region further comprises a guide region spaced apart from the second interference region in a circumferential direction of the pin insertion hole and protruding toward the clutch fixing module; and
the guide region has a shape having a height at which the guide region protrudes outward, the height varying depending on positions in the circumferential direction of the pin insertion hole.

13. The seating device of claim 12, wherein the guide region has a shape such that the height at which the guide region protrudes outward decreases toward two opposite ends based on the circumferential direction of the pin insertion hole.

14. The seating device of claim 10, wherein the clutch fixing module further comprises:
a bolt member protruding from the fixing module body region toward the fixing handle body region; and
a bolt rotating member connected to the bolt member and configured to rotate the bolt member; and
wherein the fixing handle body region further comprises a fixing handle nut member provided on a surface of the fixing handle body region and coupled to the bolt member by a bolt-nut engagement.

15. A seating device comprising:
a frame unit comprising a chair region capable of supporting a user and a leg region extending downward from the chair region;
a backrest unit disposed at a rear side of the frame unit, the backrest unit being rotatable relative to the frame unit and comprising:
a first concave-convex member having a first concave-convex region;
a second concave-convex member having a second concave-convex region having a shape corresponding to the first concave-convex region;
a first handle member fixedly coupled to the second concave-convex member;
a rod member configured to penetrate the second concave-convex member; and
a backrest unit rotary shaft configured to penetrate the first concave-convex member and the rod member, wherein the second concave-convex member is movable in a direction in which the rod member extends and the first concave-convex member and the rod member are rotatable about the backrest unit rotary shaft;
a handle unit coupled to a first side of the frame unit, the handle unit comprising:
a fixing handle body region having a first side coupled to the frame unit and rotatable relative to the frame unit;
a lifting handle body region having a first side coupled to the fixing handle body region and rectilinearly movable relative to the fixing handle body region;
a motor comprising a rotary shaft;
a screw member having a screw thread region formed on an outer portion thereof, the screw member being fixedly coupled to the fixing handle body region;
a nut member coupled to the screw thread region of the screw member and configured to rotate by receiving power from the motor, the nut member being rotatably coupled to the lifting handle body region, wherein the lifting handle body region is configured to perform a translational motion relative to the fixing handle body region using a translational motion of the nut member;
a torsion spring member comprising a winding region;
a first spring extension region extending from a first side of the winding region; and
a second spring extension region extending from a second side of the winding region; and
a connection rotary shaft having a first side configured to penetrate the fixing handle body region and a second side configured to penetrate the leg region, the connection rotary shaft being inserted into and coupled to the winding region.

16. The seating device of claim 15, wherein the first concave-convex region of the first concave-convex member is provided in plural, and the plurality of first concave-convex regions is disposed in a circumferential direction of the backrest unit rotary shaft.

17. The seating device of claim 15, wherein the backrest unit further comprises:
- a second handle member spaced apart from the first handle member in the direction in which the rod member extends and is fixedly coupled to the rod member; and
- a handle elastic member disposed between the first handle member and the second handle member and configured to support the first handle member and the second handle member.

18. The seating device of claim 17, wherein the chair region comprises:
- a chair frame having a shape extending in a horizontal direction;
- a wire member having a first side fixed to the second handle member;
- a wire fixing pin member to which a second side of the wire member is fixed; and
- a pin accommodation member fixedly coupled to the chair frame, accommodating the wire fixing pin member, and having an internal space in which the wire fixing pin member is movable, wherein the leg region comprises a first link having a link hole into which the pin accommodation member is inserted.

19. The seating device of claim 18, wherein:
the chair region further comprises a pin pressing elastic member disposed in the pin accommodation member and configured to press the wire fixing pin member toward the first link; and
the wire member is configured to pull the wire fixing pin member in a direction opposite to a direction in which the pin pressing elastic member presses the wire fixing pin member.

20. The seating device of claim 19, wherein the chair region further comprises a pulley member fixedly coupled to the chair frame and provided between the wire fixing pin member and the second handle member based on a direction in which the wire member extends, the wire member being bent around the pulley member.

* * * * *